Figure 1:
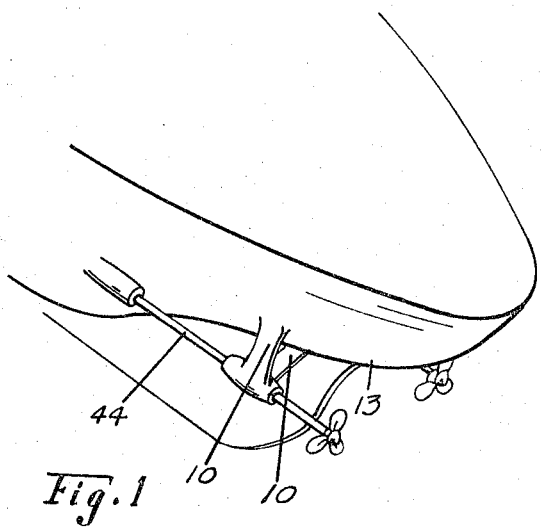

May 2, 1967 J. G. SATTERTHWAITE ET AL 3,317,254
DEMOUNTABLE MARINE BEARING
Filed Dec. 19, 1963
4 Sheets-Sheet 1

INVENTORS
JAMES GLENN SATTERTHWAITE
JAMES B. MACY JR.

BY *Felix A. Russell*

ATTORNEY

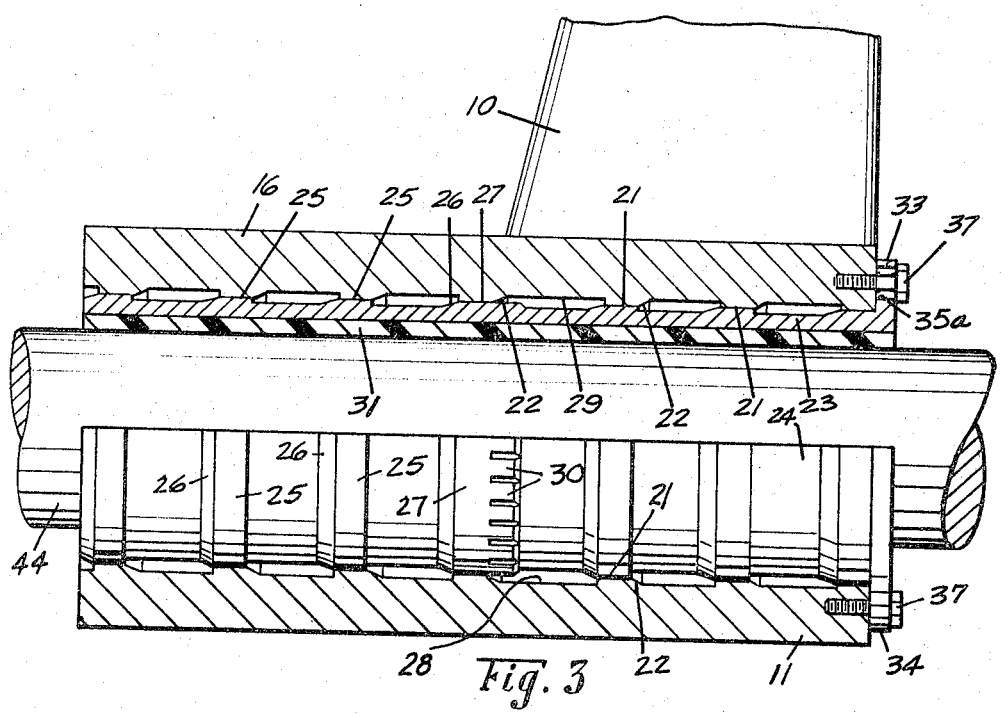
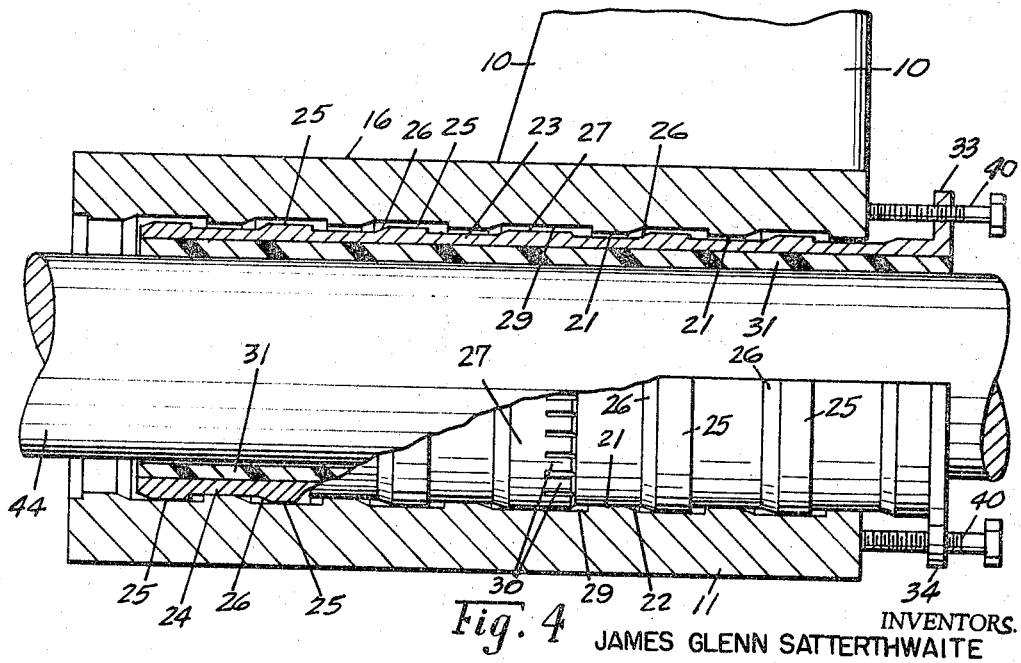

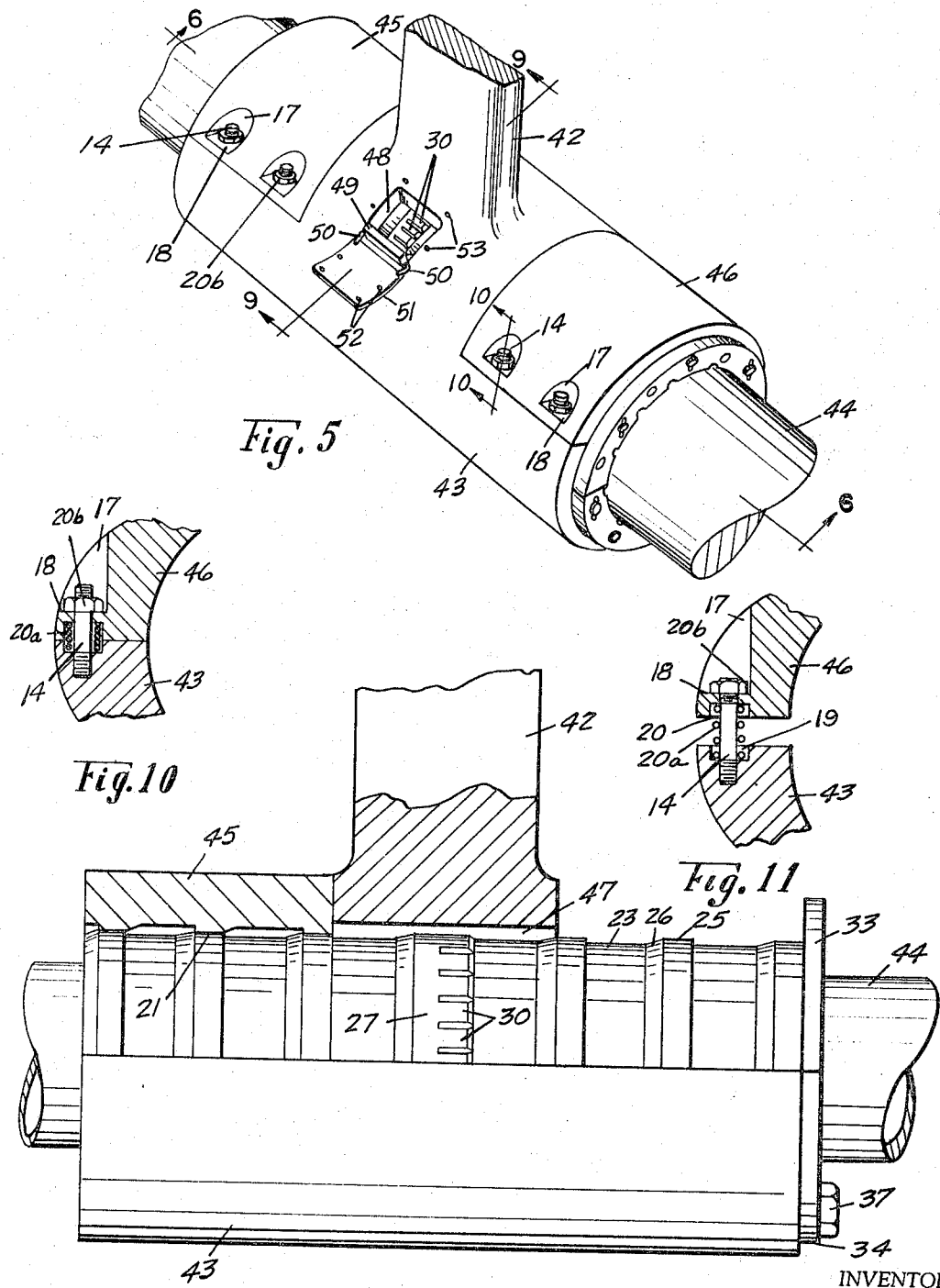

May 2, 1967  J. G. SATTERTHWAITE ET AL  3,317,254
DEMOUNTABLE MARINE BEARING
Filed Dec. 19, 1963  4 Sheets-Sheet 4
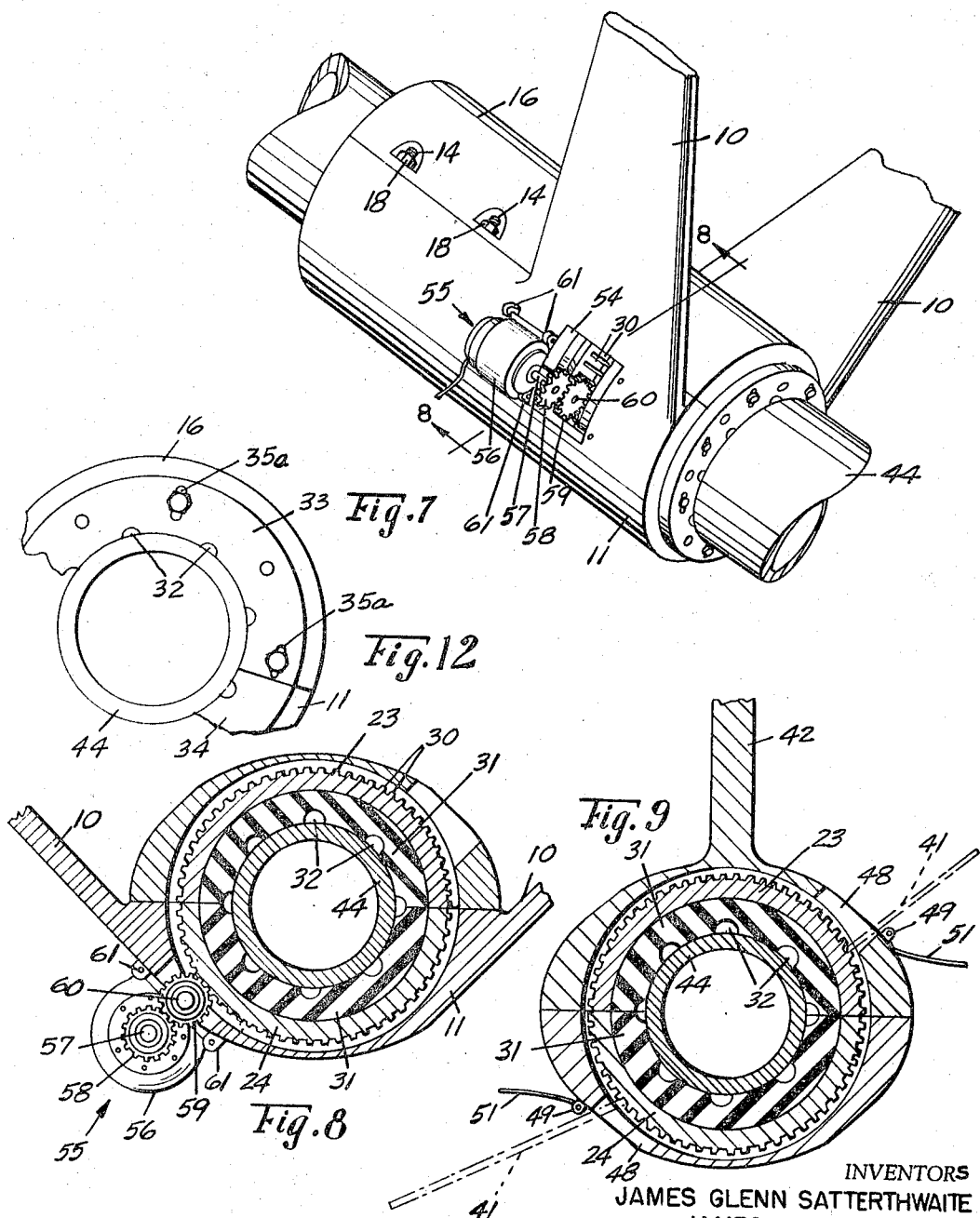
INVENTORS
JAMES GLENN SATTERTHWAITE
JAMES B. MACY JR.
BY Felix A. Russell
ATTORNEY

United States Patent Office 3,317,254
Patented May 2, 1967

3,317,254
DEMOUNTABLE MARINE BEARING
James Glenn Satterthwaite, 305 Sterling Point Drive,
Portsmouth, Va. 23703, and James B. Macy, Jr., 107
Holly Lane, Morehead City, N.C. 28557
Filed Dec. 19, 1963, Ser. No. 331,795
4 Claims. (Cl. 308—26)

The present invention relates to a demountable multi-surfaced quick release marine bearing and method of using the same and constitutes a continuation-in-part of our application, Ser. No. 246,964, filed Dec. 26, 1962, and entitled, "Demountable Housing for Marine Bearings and Method of Using the Same," now Patent No. 3,236,570, and it consists in the combinations, constructions and arrangements of parts herein described and claimed.

Generally, the present invention comprises a bearing construction designed to facilitate quick removal, replacement and/or inspection of marine bearings of relatively large sizes as, for example, those used in conjunction with propeller shafts having a diameter of twelve or more inches. In such large sized structures, the 180° segments composing the bearings are themselves of relatively great weight and, although easy access is afforded thereto under the teachings of our invention set forth in the above-noted parent application, nevertheless, the greater mass and weight of such large bearings presents a handling problem using conventional methods. In the instant invention, in order to obtain both mechanical advantage and adequate clearances in the rotation of the bearing 180° segments, the base of the bearing housing is interiorly provided with a series of spaced, integrally formed, inwardly extending ring-like members, while the shells of the bearing segments are externally provided with like members. Novel means is provided for moving the shells axially and outwardly of the housing so that the surfaces of the ring-like members become disengaged allowing the bearing members to move in to the spaces between the ring-like members of the housing, thus providing substantial clearances between the rubber bearing surfaces and the shaft, and between the bearing shells and upper and lower housings. Easy rotation of the bearing segments is now possible for inspection, removal and/or replacement. Novel means is provided for mechanically rotating the bearing segments either manually or by motor operation. Novel spring means is provided for maintaining the two portions of the housing apart when the holding bolts are loosened. Other novel features are provided.

It is accordingly an object of the invention to provide a novel demountable multi-surfaced quick release marine bearing which is simple in construction, inexpensive to manufacture and yet effective and efficient in use.

Another object of the invention is the provision of a novel method of removing, replacing and/or inspecting bearings of the character described in marine installations.

Still another object of the invention is to provide, in a device of the character set forth, novel supporting and aligning members as a part of a housing and a bearing shell, said supporting and aligning members forming parts of the invention.

A further object of the invention is the provision, in a device of the character set forth, of novel means for moving said supporting and aligning members out of mutual contact whereby to provide clearances for rotating the bearing segments with respect to the housing.

A still further object of the invention is to provide novel means for moving said bearing segments longitudinally and vertically with respect to said bearing housing.

Still another object of the invention is the provision, in a device of the character set forth, of novel manually operable means for mechanically rotating the bearing segments with respect to the bearing housing.

Still a further object of the invention is to provide, in a device of the character set forth, of novel motor operable means for mechanically rotating the bearing segments with respect to the bearing housing.

Another object of the invention is the provision, in a device of the character set forth, of novel means for guiding the bearing segments into proper position when returning the latter from their disaligned to their operable position.

Figure 2:
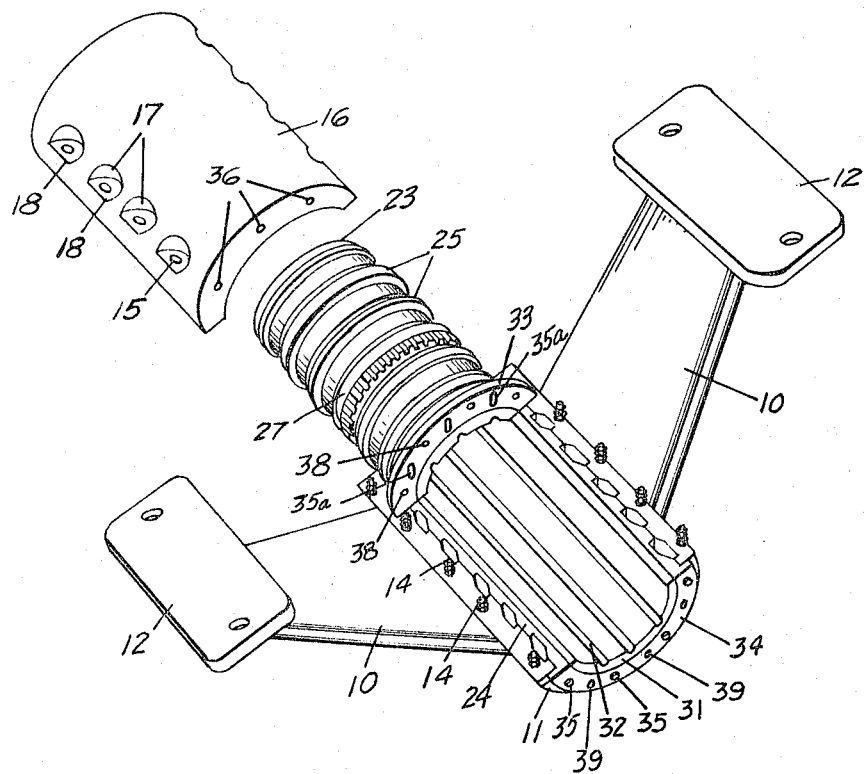

Other and further objects of the invention will become apparent from a reading of the following specification taken in conjunction with the drawings, in which:

FIGURE 1 is a fragmentary perspective view of an embodiment of the invention showing the same in operable position upon a ship, FIGURE 2 is an exploded perspective view illustrating the present invention, FIGURE 3 is an enlarged fragmentary vertical sectional view, partly in elevation, of the device of FIGURE 2 showing the same in operable condition, FIGURE 4 is a view similar to FIGURE 3 but showing segmental bearings jacked out of alignment and for freedom of rotation with respect to their housing, FIGURE 5 is a fragmentary perspective view of a modified form the invention may assume, FIGURE 6 is a fragmentary sectional view, partly in elevation, taken along 6—6 of FIGURE 5, FIGURE 7 is a view similar to FIGURE 5 showing a further modification of the invention, FIGURE 8 is a fragmentary sectional view taken substantially along line 8—8 of FIGURE 7, FIGURE 9 is a fragmentary sectional view taken substantially along line 9—9 of FIGURE 5, FIGURE 10 is an enlarged fragmentary sectional view taken along line 10—10 of FIGURE 5 and showing the housing fully closed, FIGURE 11 is a view similar to FIGURE 10 but showing the housing partially opened and held in such position by springs forming a part of the invention, and FIGURE 12 is a fragmentary end elevational view, partly in section, illustrating a shell flange and allied structure forming parts of the invention.

Referring more particularly to the drawings, there is shown therein, in FIGURES 1 to 4, inclusive, a bearing assembly according to the present invention wherein a pair of web arms 10 is integrally formed or otherwise rigidly connected at their lower ends to a lower bearing housing 11, the upper ends of the arms having integral flat plates 12 for attachment as by welding or the like to the hull 13 of a ship. The housing section 11 is semi-cylindrical in shape and is provided along each of its longitudinal edge portions with upwardly extending lugs 14 which are receivable in openings 15 in a fully removable upper bearing housing 16 which is likewise semi-cylindrical in shape. The upper ends of the openings terminate in nut receiving recesses 17 having flattened bottoms 18. An open topped recess 19 is provided in the lower bearing housing 11 around each of the studs 14 and an open bottomed recess 20 is provided in the lower face of the upper bearing housing 16 about each of the openings 15. (See FIGURES 10 and 11 for identical structure.) A compression spring 20a surrounds each stud 14 and is confined in the recesses 19 and 20. Nuts 20b are threaded on the free ends of the studs 14.

The inner faces or bore of the housing members 11 and 16 are each provided with inwardly radially directed ring-like members 21 which are longitudinally spaced from one another and each of which has a cylindrical surface and a rearwardly and outwardly tapering guide surface 22. A semicylindrical upper bearing shell 23 and a complementary semicylindrical lower bearing shell 24 are each provided with integrally formed outwardly radially directed ring-like members 25 which are longitudinally spaced from one another and each of which is provided with a cylindrical surface and a forwardly and inwardly tapering guide surface 26 and it will be apparent that in normal assembled relation, as shown in FIGURE 3, the cylindrical surfaces of the members 21 and 25 are in closely abutting relationship.

The centermost of the ring-like structures 21 on upper and lower bearing shells are somewhat enlarged, as indicated at 27, and the rearwardly adjacent recess 28 between the ring-like members 21 is likewise enlarged, as shown at 29. The ring-like member 27 is provided in its rearward portion with a series of circumferentially extending gear-like teeth 30.

The shells 23 and 24 are of metal and each has molded, vulcanized, cemented or otherwise affixed thereto, a semicylindrical thick lining 31 of bearing rubber of known composition. The linings have a series of longitudinally extending grooves 32 in their inner surfaces for conducting water into the bearing to lubricate the same.

The rear edge portion of each of the shells 23 and 24 are provided with integrally formed complementary outwardly extending flanges 33 and 34, respectively, which are fastened by bolts 37 through openings 35a and 35, respectively, provided therein and into threaded openings 36 in the casing members 11 and 16. It will be seen that the openings 35a are vertically elongated for a purpose to be described hereafter.

The flanges 33 and 34 are also provided with a series of threaded openings 38 and 29, respectively, for the reception of jack bolts 40.

In the operation of the form of the invention illustrated in FIGURES 1 to 4, inclusive, it will be apparent that when it is desired to inspect or to remove and replace one or both of the bearing members 31 and their attached shells, the upper housing member is first raised a relatively short distance by partially unscrewing the nuts 20b, the springs acting at the same time to raise the upper housing member 16 and to maintain it in such raised position. The bolts 37 in the flange 33 have, during this operation, been removed from the elongated openings 35a thus permitting the upward movement of the upper housing member as aforesaid. The jack bolts 40 are then inserted into the threaded openings 38 and 39 in the flanges 33 and 34 and screwed thereinto thus bottoming against the adjacent face of the housing 16. This action will cause the shell segments 23 and 24 to be moved outwardly, that is to say, rearwardly, of the housing from the position shown in FIGURE 3 to the position illustrated in FIGURE 4, thus moving the cylindrical faces of the ring-like members 25 out of abutting engagement with the cylindrical faces of the ring-like members 21 into the recesses between the members 21 thus allowing greatly reduced frictional contact between the shells and housing. In all instances wherein the lower bearing member is involved, the propeller shaft 33 must first be jacked upwardly, the distance required to restore it to a true position of alignment, thus removing its weight, or the greater portion thereof, from the lower bearing member is involved, the propeller shaft 44 must pletely removed, thus exposing the shell 23 which may, if desired, be immediately removed for inspection, and/or replaced by a freshly lined shell, or, both upper housing and bearing shell may be allowed to remain in place, slightly loosened, and by utilizing a lever or the like, inserted through provided opening into gearlike teeth as shown, for example in dotted lines at 41 in FIGURE 9, both shells may be rotated until the lower shell is fully exposed in the top position, at which time it may be inspected, and if needed, replaced by removal of the upper bearing housing 16. In the case of the latter, for replacement of the upper shell in its final position, it is simply necessary to place it so flange 33 will be flush against upper housing 16 when upper housing is again set into place. Final positioning of the lower shell is accomplished by exerting onward or forward pressure thereon, by use of the jack bolts, whereupon the tapering guide surfaces 26 will ride upon the like tapering guide surfaces 22, thus bringing the lower shell into proper and final position as shown in FIGURE 3, whereupon the flanges 33 and 34 may again be bolted into permanent position.

In the form of the invention shown in FIGURES 5 and 6, a web arm 42 is centrally affixed to a cylindrical bearing housing 43. Those parts of the invention which are identical with those described hereinabove with respect to the showing in FIGURES 1 to 4, inclusive, have been given identical reference characters and will not be again described.

Referring now more particularly to the structure shown in FIGURES 5 and 6, it will be seen that there is provided forwardly and rearwardly, respectively of the arm 42, removable semicylindrical upper housing heads 45 and 46, respectively. That part of the housing immediately adjacent to the web arm 42 is provided with a relatively large bore, as shown at 47 in FIGURE 6 and encloses the enlarged ring-like member 27 and the annular recesses at each side thereof. The heads 45 and 46 are affixed to the housing 43 with the studs 41 and allied structure as heretofore described.

A rectangular opening (jacking port) 48 is centrally provided adjacent to either side of the web arm 42, as shown in FIGURE 5, and a longitudinally extending lip 49 extends along the housing 43 adjacent to the lower edge of the opening 48 to which is affixed by suitable hinges 50 a curvular cover 51 for the jacking port 48. Holes 52 are provided in the cover 51 in alignment with the threaded openings 53 in the housing 43 for the reception of bolts for locking the cover 51 in normal operating condition.

In the operation of this form of the invention, it will be apparent that when it is desired to inspect and/or replace one or more of the shell segments (usually a replacement is made of the lower shell since it receives the greater part of the wear in service), it is merely necessary to loosen the nuts 20b allowing the springs 20a to raise and hold the heads 45 and 46 as heretofore described with reference to the housing member 16. The shaft 44 is first of course, jacked upwardly a slight distance, as heretofore described. Thereupon the cover 51 is opened thus exposing to view the gear-like teeth 30. The jack bolts 40 are then used as above described to move the bearing shells rearwardly until the cylindrical surfaces of the ring-like members are brought out of abutting relation, whereupon the shell segments may be rotated as a unit, utilizing a lever 41 or the like with the gear-like teeth 30 and using the lip 49 as a fulcrum. When the lower bearing segment has been rotated to the position formerly occupied by the upper bearing segment, it may be removed rearwardly, the enlarged bore 47 assisting in providing the necessary space for such action. It may then be replaced by a new or relined bearing segment and the segments returned by pressure to their initial positions and the bolts 37 replaced.

In the form of the invention shown in FIGURES 7 and 8, again identical parts to those heretofore described have been given identical reference characters.

The device of FIGURES 7 and 8 is similar to that shown in FIGURES 1 to 4, inclusive, except that an opening (jacking port) 54 is provided centrally adjacent one of the arms 10. The cover for the opening 54 is similar to the cover 51 but is not hinged and is completely removable. An electric motor generally indicated at 55 is provided with a motor housing 56 and a drive shaft 57 carrying a gear 58 which is enmeshed with an intermediate gear 59 carried by a stub shaft 60 which is, in turn, affixed in any suitable manner to the motor housing 56. The motor 55 is removably attached to the lower housing 11 by suitable brackets indicated at 61.

In the operation of the device illustrated in FIGURES 7 and 8, when it is desired to inspect and/or replace the bearing segments, the operation is again as heretofore described with respect to the forms of the invention illustrated in FIGURES 1 to 6, inclusive, except that when it becomes necessary to rotate the bearing segments, the cover for the opening 54 (jacking port) is first removed and the motor 55 attached to the brackets 61. This action enmeshes the gear 59 with the teeth 30 and operation of the motor 55 will thereupon cause rotation of the bearing segments through shafts 57, gear 58 and consequently gear 59.

In FIGURE 9, there is shown instead of one opening 48 (jacking port) and associated cover 51, two such openings and covers are placed at diametrically oppositions in the bearing housing thus providing additional access to the bearing shells.

While but certain forms of the invention have been shown and described herein, it will be readily apparent to those skilled in the art that many minor modifications may be made without departing from the spirit of the invention or the scope of the appended claims.

What is claimed is:

1. A marine bearing assembly adapted to be mounted around propeller shafting of a vessel, comprising housing means adapted to be positioned around said shafting, bearing segments each formed with an inner rubber bearing surface adapted for bearing engagement with the propeller shafting, said segments having axially extending edges adapted to abut to form a complete tubular bearing around said shafting, the outer surfaces of said segments being formed with a plurality of axially spaced circumferentially extending lands projecting outwardly therefrom, said housing means having a plurality of corresponding axially spaced circumferentially extending lands projecting inwardly therefrom and aligned with and engaging the lands on said segments in the normal position of said segments, releasable means securing said segments in said normal position, said segments, upon release of said releasable means, being movable axially through a distance equal to the axial length of said lands into displaced position, the spaces between said lands on said housing means being sufficiently long to receive the lands on each of said segments to permit radially outward movement thereof with respect to said shafting in said displaced position, whereby said segments are supported in bearing position about said shafting in said normal position and are free for rotation about said shafting in said axially displaced position.

2. A marine bearing assembly adapted to be mounted around propeller shafting of a vessel comprising housing means adapted to be positioned around said shafting, bearing segments each formed with an inner rubber bearing surface adapted for bearing engagement with the surface of the propeller shaft, said segments having axially extending edges adapted to abut to form a complete tubular bearing around said shafting, the outer surfaces of said segments being formed with a plurality of axially spaced circumferentially extending lands projecting outwardly therefrom, said housing means having a plurality of corresponding axially spaced circumferentially extending lands projecting inwardly therefrom and aligned with and engaging the lands on said segments in the normal position thereof, the spaces between said lands on said housing means being sufficiently long to receive the lands on each of said segments to permit radially outward movement thereof with respect to said shafting in axially displaced position, said housing means including releasable clamping means pressing the lands on said housing means into engagement with the lands on said segments in said normal position thereof.

3. A marine bearing assembly adapted to be mounted around propeller shafting of a vessel, comprising housing means having an inner surface and adapted to be positioned with said inner surface encircling said shafting, bearing segments each formed with an inner rubber bearing surface adapted for bearing engagement with the propeller shafting, said segments having axially extending edges adapted to abut to form a complete tubular bearing around said shafting, the outer surfaces of said segments being formed with a plurality of axially spaced circumferentially extending areas with different radial depths, the inner surface of said housing means having corresponding areas with different radial depths, the areas of maximum radial depth on said segments and on said housing means engaging each other and supporting said segments in bearing position and frictionally restraining said segments against rotation about said shafting in the normal axial position of said segments, releasable means securing said segments in said normal axial position, each of said segments, upon release of said releasable means, being movable axially into displaced position in which its area of minimal radial depth are aligned with areas of minimal radial depth on said housing to permit radially outward movement of each segment with respect to said shafting in said displaced position, whereby said segments are free for rotation about said shafting in said axially displaced position.

4. A marine bearing assembly adapted to be mounted around the propeller shaft of a vessel, comprising a lower substantially semi-cylindrical housing member adapted to be secured to the hull of a vessel and to be positioned beneath said shaft, an upper substantially cylindrical housing member adapted to be positioned above said shaft, screw threaded means detachably securing said upper housing member to said lower housing member, bearing segments each formed with an inner rubber bearing surface adapted for bearing engagement with the propeller shaft, said segments being positioned within said upper and lower housing members and having axially extending edges adapted to abut to form a complete tubular bearing around said shaft, spring means acting between said upper and lower housing members and exerting a force thereon sufficient to lift said upper housing away from said lower housing member when said screw threaded means are loosened whereby a bearing segment positioned in said lower housing member may be brought into position above said shaft by loosening said screw threaded means, lifting and supporting the weight of said propeller shaft and thereafter rotating said bearing segments as a complete tubular bearing guided within said lower housing member and said upper housing member partially lifted therefrom by said spring means.

References Cited by the Examiner

UNITED STATES PATENTS

| | | | |
|---|---|---|---|
| 953,216 | 3/1910 | Mix | 308—62 |
| 1,208,354 | 12/1916 | Myers | 308—63 |
| 1,641,726 | 9/1927 | Bond | 29—149.5 |
| 1,743,548 | 1/1930 | Howes | 308—15 |
| 2,031,761 | 2/1936 | Diescher | 308—58 |
| 2,913,810 | 11/1959 | Heim | 29—148.4 |
| 3,109,223 | 11/1963 | McCloskey | 29—148.4 |

FOREIGN PATENTS 522,537  9/1953  Belgium.

JOHN F. CAMPBELL, *Primary Examiner.*

THOMAS H. EAGER, *Examiner.*